United States Patent
Judkins et al.

[11] Patent Number: 5,098,234
[45] Date of Patent: Mar. 24, 1992

[54] HOLLOW DRILL FOR FABRIC AND THE LIKE

[75] Inventors: Ren Judkins, Killbuck Township, Allegheny County; Ralph Jelic, Valencia, both of Pa.

[73] Assignee: Verosol USA Inc., Pittsburgh, Pa.

[21] Appl. No.: 224,669

[22] Filed: Jul. 27, 1988

[51] Int. Cl.⁵ .............................................. B23B 51/00
[52] U.S. Cl. ................................... 408/204; 408/205; 76/108.1
[58] Field of Search .............. 408/204, 207, 704, 703, 408/67, 205, 206, 203.5, 227, 229; 83/825 CC; 76/108 R; 112/80.05, 80.08, 80.02

[56] References Cited

U.S. PATENT DOCUMENTS

| | | | |
|---|---|---|---|
| 302,941 | 8/1884 | Robarge | 408/206 |
| 464,252 | 12/1891 | Knoepfel et al. | 408/204 |
| 537,044 | 4/1895 | Krauss | 408/204 |
| 1,219,677 | 3/1917 | Sparks | 408/204 |
| 1,557,464 | 10/1925 | Mick | 408/204 |
| 2,191,493 | 2/1940 | Reilly | 76/108 R |
| 2,354,656 | 8/1944 | Annesley | 76/108 R |
| 2,688,264 | 9/1954 | Rudquist | 76/108 R |
| 3,512,519 | 5/1970 | Hall | 408/205 X |
| 3,617,145 | 11/1971 | Celmer | 408/204 |
| 4,632,611 | 12/1986 | Burns | 408/205 |
| 4,767,244 | 8/1988 | Peterson | 408/204 |

FOREIGN PATENT DOCUMENTS

| | | | |
|---|---|---|---|
| 97879 | 11/1984 | European Pat. Off. | |
| 777245 | 2/1935 | France | 408/205 |
| 931764 | 7/1963 | United Kingdom | 408/204 |

Primary Examiner—Larry I. Schwartz
Assistant Examiner—Robert Schultz
Attorney, Agent, or Firm—Buchanan Ingersoll

[57] ABSTRACT

A hollow drill for fabric and the like is comprised of a hollow shaft having highly polished inside and outside surfaces and an outside diameter of preferably not more than 0.130 inches. A tip having a larger outside diameter and smaller inside diameter is brazed or soldered to the shaft. The shaft is made by a continuous manufacturing method such as extrusion and the tip is machined or molded followed by finish machining.

8 Claims, 1 Drawing Sheet

HOLLOW DRILL FOR FABRIC AND THE LIKE

FIELD OF INVENTION

The present invention relates to drills having a hollow center through which the drilled material exits from the workpiece.

DESCRIPTION OF THE PRIOR ART

Hollow drill bits have been used for drilling many materials. They are commonly used for drilling stacks of thin layers such as paper or fabric. When layered material is drilled one produces a freely movable chip from each sheet. These chips are produced rapidly and are approximately the same size as the hole being drilled. Consequently, they produce friction and heat when they flow through the hollow drill.

Hollow drills can be made from rod stock which is bored through the center or they can be made from tube stock. Boring or machining creates stress within the drill bit which weakens the bit. It is also difficult to polish the inside surface and outside surface of machined bits to create highly polished surfaces which reduce friction between the bit and the fabric being drilled.

It is quite common to see hollow drill bits of large sizes, but smaller hollow drill bits, particularly those with holes having a diameter less than 0.125 inches, are less frequently used. Furthermore, it is uncommon to see a hollow drill bit in the 0.125 inch diameter range which is over two inches in length. The reason for this is that hollow drill bits do not cut or transport material as efficiently as solid bits and therefore have more friction within the material than solid bits. As drills become smaller their flexibility increases and making straight holes becomes more difficult. Consequently, those skilled in the art have considered it impossible to make a very small diameter, hollow, drill bit of over two inches in length.

The art has recognized the importance of preventing clogging of hollow drill bits. To improve the travel of drilled material through the bit, the art has used tubes with highly polished inside surfaces. The art has also developed an inside surface which becomes larger as one travels from the cutting edge to the exit. The prior art has not, however, incorporated these features in very small hollow drill bits as they generally believed that it was impossible to produce a useful, hollow drill bit having a diameter less than 0.125 inches.

Consequently, there is a need for a durable hollow drill bit of less than 0.125 inch diameter which can drill a straight, uniform diameter hole in fabric without becoming so hot as to melt the fabric and which can be made at a reasonable cost.

BRIEF DESCRIPTION OF THE INVENTION

A hollow drill bit is provided with an outside diameter within the range 0.060 to 0.130 inches outside diameter and with an inside diameter of approximately 0.040 to 0.085 inches. The drill bit is preferably made from tubing having a highly polished inner surface. A drill tip is attached to the tubing. The drill tip is preferably sized to be fitted onto the stainless tubing to create a step along the inside surface of the drill. This step results in a widening of the channel through the drill bit as one goes from the cutting edge to the exit.

It is preferable to provide a step on the outside surface of the drill bit and stainless steel tube. This step provides stress relief for the fabric which is stretched during drilling.

I prefer to provide points or teeth on the drill tip. The points preferably are sloped inwardly toward the hollow passageway of the drill bit.

DESCRIPTION OF THE PREFERRED EMBODIMENTS

Figure 1:
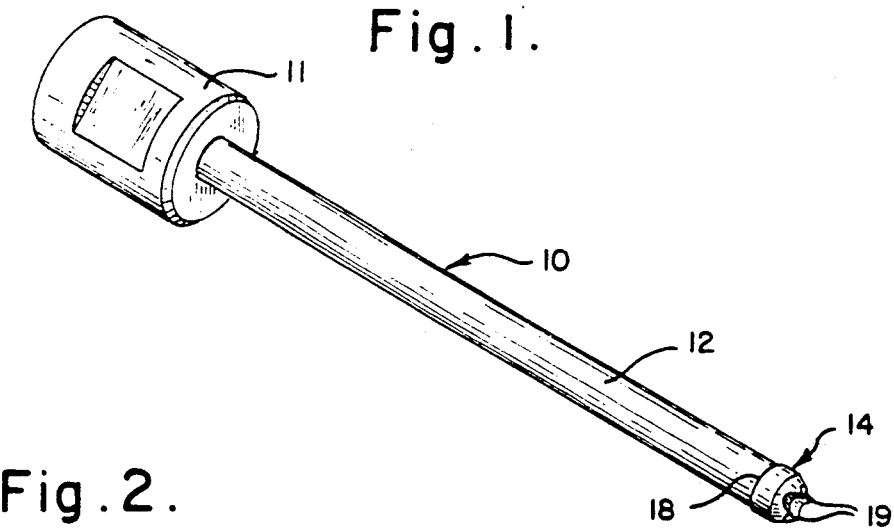
FIG. 1 is a perspective view of the present preferred embodiment of my drill.
Figure 2:
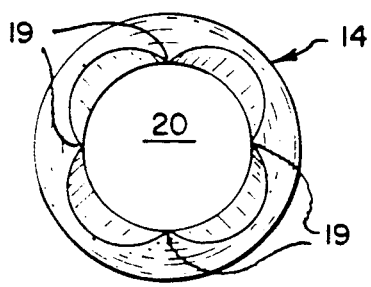
FIG. 2 is an end view showing the cutting end of the drill of FIG. 1.

As shown in the drawings, the drill includes a shaft 10 having an outside surface 12 and inside surface 13. The shaft 10 may be made from stainless steel, tool steel or tungsten carbide steel. Preferably the inside surface is highly polished. The tubing preferably has an outside diameter of 0.060 to b 0.130 inches. A tip 14 is soldered or brazed to the cutting end of the drill bit. The tip 14 may be made from tungsten carbide steel or tool steel. When attached to the shaft 10, tip 14 is constructed to provide a step 16 along the inner surface of the drill bit. I also prefer to provide a step 18 at the outer surface of the drill bit. Step 18 allows the fabric which is stretched during drilling to relax as it passes over the cutting tip. Step 16 creates a widening of the channel 20 of the drill bit through which waste material is being expended. Steps which are not greater than 0.010 inch work well. I prefer to have a cutting edge 17 on the tip which is sloped inwardly toward the center channel 20. For ease of machining I prefer to provide an even number of points or cutting teeth 19. I have found that a drill bit having four cutting teeth works quite well. I also provide a base 11 on the end of the shaft opposite tip 14. This base is preferably about 0.5 inches in diameter and is inserted into the chuck of a drill.

Shaft 10 preferably has a wall thickness of 0.010 to 0.020 inches and is constructed from stainless steel. Such tubing is generally used for medical applications and is available through a number of supply houses.

Figure 3:
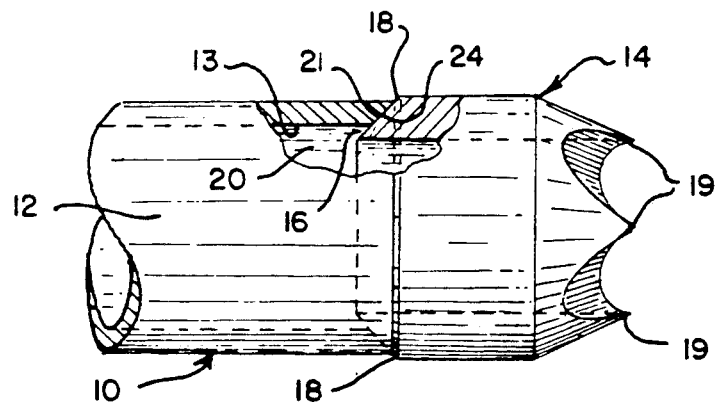
FIG. 3 is a detailed view partially in section showing a first preferred drill tip and shaft interface configuration.

Preferably, tip 14 is carbide. Whenever one solders a carbide tip 14 to a stainless steel shaft 10, the two metals exhibit different thermal expansion rates. Consequently, it is preferable to provide sloped mating surfaces 21 and 24 on the shaft 10 and tip 14 as shown in FIG. 3. During soldering fillets will be created at steps 16 and 18. The differential cooling expansion rates of the stainless steel tip and the carbide tip may cause the shaft 10 to move relative to tip 14. However, such movement will be a sliding action along the mating surfaces and will not weaken the joint.

Figure 4:
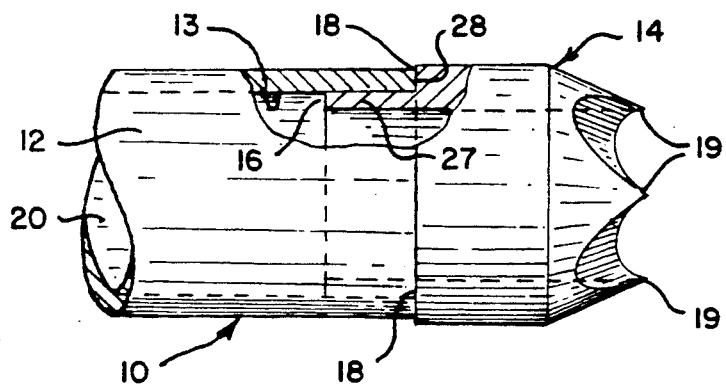
FIG. 4 is a detailed view partially in section showing a second preferred drill tip and shaft interface configuration.

It is also possible to use an overlap connection between the tip 14 and the shaft 10 as shown in FIG. 4. Here end portion 27 of tip 14 fits within the shaft 10. The shaft fits against seat 28 of tip 14 and preferably is sized to create step 18. The trailing edge of end portion 27 provides step 16 within the drill.

As the drill enters the fabric the chips flow up through channel 20 past step 16. As they pass step 16 they flow more easily which reduces the friction between wall 13 and the chip. Friction is also reduced when the uncut fabric passes past step 18 and relaxes. This combination of steps creates a significant reduction in friction and a corresponding reduction in heat generated during drilling.

Because my drill is constructed from a tip which is attached to a separately made shaft, the shaft can be made from the same material or a different material than the tip material. More importantly one can use a different manufacturing technique for the shaft than one uses for the tip. This permits one to extrude, roll or otherwise continuously manufacture the shaft. The tip can be machined or molded and finish machined. Use of different manufacturing methods for the shaft and the tip provides a drill having optimum mechanical properties.

I prefer to construct a drill bit to have a total length of approximately three inches. This enables me to drill through material of 2½ inches which is the thickness of pleated fabric commonly used for blinds.

My drill enables me to produce small holes which are very straight throughout two inches of pleated fabric.

While I have shown and described certain preferred embodiments of my invention, it should be distinctly understood that the invention is not limited thereto, but may be variously embodied within the scope of the following claims.

We claim:

1. A hollow drill for fabric and the like having a length of at least 2.5 inches comprising:
    a hollow shaft having a highly polished cylindrical inside surface, a highly polished cylindrical outside surface, and an outside diameter of not more than 0.130 inches, said inside and outside surfaces defining a constant wall thickness of 0.010 to 0.020 inches;
    a base attached to one end of the shaft, said base being sized and configured for insertion into the check of a drill; and
    a cylindrical tip axially aligned with said shaft, said tip having an inside diameter less than an inside diameter of the shaft, and said tip having an outside diameter greater than the outside diameter of the shaft, said tip being rigidly attached to the shaft with a first step formed on the outer surface of the drill said first step defined by the difference in outside diameters of the shaft and the tip, and a second step formed on the inner surface of the drill said second step defined by the difference in the inside diameters of the shaft and tip, each of said steps being not greater than 0.010 inches; said tip having a substantially conically shaped tapered portion tapered radially inwardly from intermediate the ends of the tip to the leading end of the tip with the leading end of the tip defining a cutting edge.

2. The drill of claim 1 wherein the tip is made from a material selected from the group of materials consisting of tool steel and carbide and the shaft is made from a material selected from the group of materials consisting of stainless steel, tool steel and carbide.

3. The drill of claim 1 wherein the shaft is made by a continuous manufacturing process and the tip is made by machining.

4. The drill of claim 1 wherein the tip has an even number of cutting teeth.

5. The drill of claim 4 having four cutting teeth.

6. The drill of claim 1 wherein the drill tip has a sloped mating surface and the shaft has a sloped mating surface which is rigidly attached to the sloped mating surface of the tip.

7. The drill of claim 1 wherein the shaft is made by a continuous manufacturing process.

8. The drill of claim 1 wherein the tip is made by one of machining and molding followed by finish machining.

* * * * *

UNITED STATES PATENT AND TRADEMARK OFFICE
CERTIFICATE OF CORRECTION

PATENT NO. : 5,098,234

DATED : March 24, 1992

INVENTOR(S) : REN JUDKINS, RALPH JELIC

It is certified that error appears in the above-identified patent and that said Letters Patent is hereby corrected as shown below:

Column 4, line 2, claim 1, change "check" to --chuck--.

Signed and Sealed this

Twenty-first Day of July, 1992

Attest:

DOUGLAS B. COMER

Attesting Officer

Acting Commissioner of Patents and Trademarks